Aug. 6, 1935.    W. J. DAVIS    2,010,350
AUTOMOBILE
Filed March 5, 1934    2 Sheets-Sheet 1
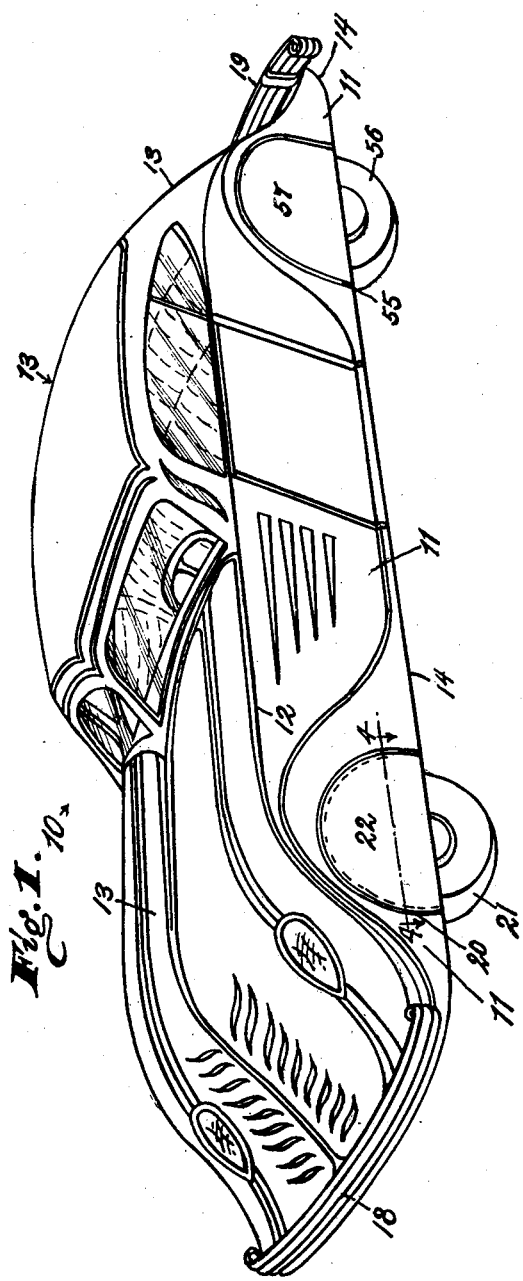
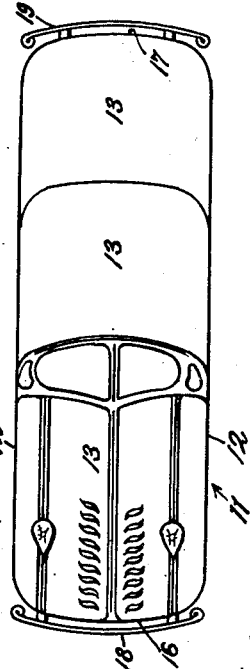
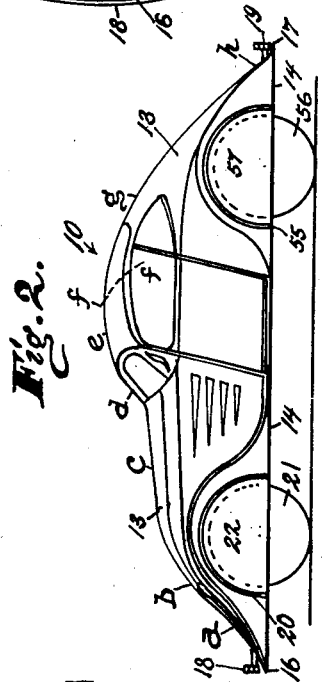
Inventor
Wesley J. Davis.
By
William M. Gentle
His Attorney.

Aug. 6, 1935.  W. J. DAVIS  2,010,350
AUTOMOBILE
Filed March 5, 1934  2 Sheets-Sheet 2
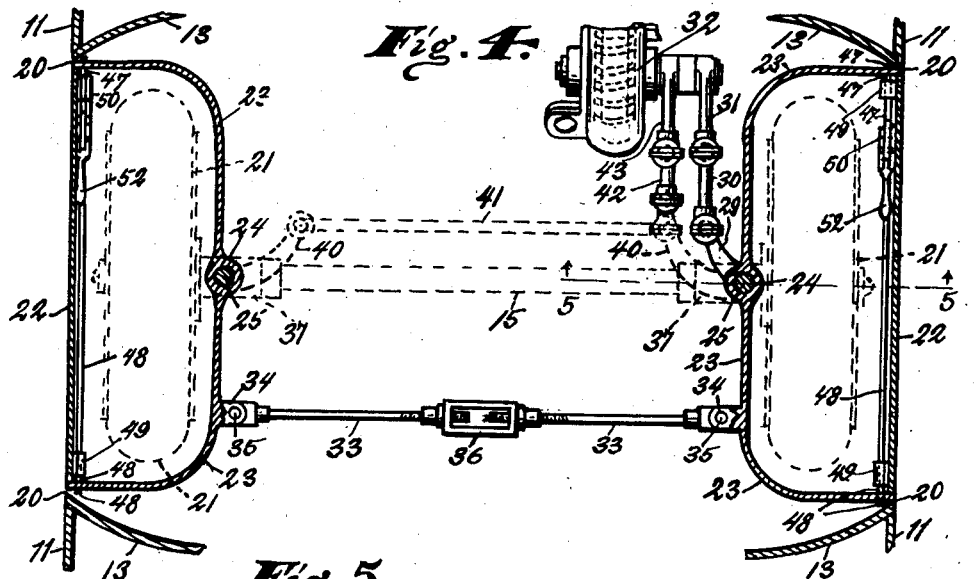
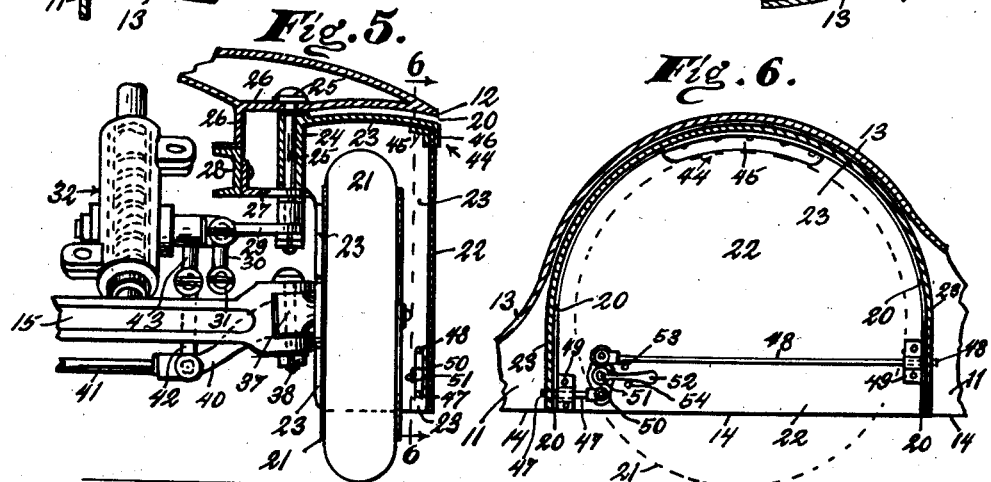
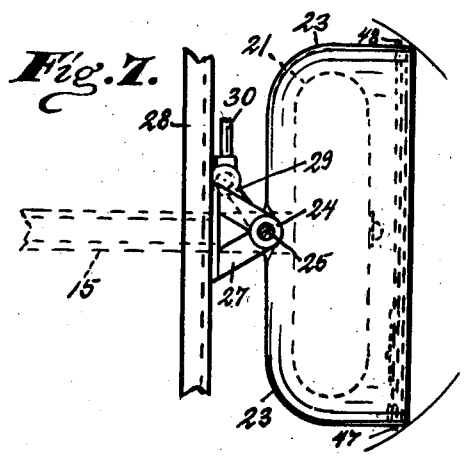
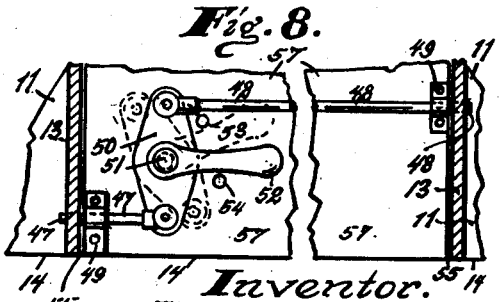
Inventor.
Wesley J. Davis.
By William W. Gentle
His Attorney.

Patented Aug. 6, 1935

2,010,350

UNITED STATES PATENT OFFICE 2,010,350

AUTOMOBILE

Wesley J. Davis, Los Angeles, Calif.

Application March 5, 1934, Serial No. 714,147

2 Claims. (Cl. 280—152)

This invention relates to an improvement in automobiles, and the principal object is to design and form the body of an automobile and cover its front wheels with housings so that in use the air resistance to travel of the automobile will be greatly reduced. To that end I provide housings for the front wheels that have side plates that normally are in vertical alignment with the straight vertical sides of the body to thereby complete the relatively perfect stream lining of the body from the front to the rear ends thereof.

A feature of invention is shown in forming the body with its lower edges extending in straight lines from the front to the back thereof and normally supported some distance below the axle line, and in line with the lower edges of the removable plates in the wheel housings.

A feature of invention is shown in providing housings for the front wheels of an automobile to aid in a complete stream line of the automobile body with means for moving the housing in the same planes as the steering arcs of the front wheels; and also in operating the housings by a connection to the steering assembly that is separate from that connected to the front wheels.

A feature of invention is shown in providing removable plates in the housings and also in the body covering the rear wheels so that any one or all of the plates can be easily removed for replacement of tires or repair to the wheels.

Other objects, advantages and features of invention may appear from the accompanying drawings, the subjoined detailed description and the appended claims.

The accompanying drawings illustrate this invention, in which:

Figure 1 is a perspective view of an automobile having a body and associated parts that are designed and constructed in accordance with this invention.

Fig. 2 is a diagrammatic side view of the automobile shown in Fig. 1, showing the parts drawn to a small scale.

Fig. 3 is a plan view of the automobile.

Fig. 4 is an enlarged semi-diagrammatic fragmental section on line 4—4, Fig. 1, showing the means for rocking the front wheel housings in the same planes as the steering arcs of the front wheels.

Fig. 5 is a semi-diagrammatic fragmental section on line 5—5, Fig. 4, showing in more detail how a front wheel hood is supported on the automobile body and connected by a drag link to the steering assembly.

Fig. 6 is a section on line 6—6 of Fig. 5, showing how a side plate is removably supported in its housing.

Fig. 7 is a diagrammatic plan view of a front wheel housing showing how it is supported on an automobile frame and rocked in an arc in time with its respective wheel.

Fig. 8 is a semi-diagrammatic fragmental section analogous to Fig. 6 showing how the plates over the rear wheels of the automobile are detachably secured in place.

The improvement in automobiles includes a body 10, having vertical sides 11 that are spaced apart the full width of the automobile and that are parallel throughout, and these sides have top edges 12 that are integral with the side edges of the top 13; and also these sides have bottom edges 14 that are straight throughout and are normally supported below the center of the axles 15.

The top 13 has front and rear ends 16, 17, the edges of which are supported in the same plane as the bottom side edges 14. In other words, the front end of the top begins in a plane slightly below the front fender 18 and extends upwardly in the compound curves a, b, c, d and e to the cross line f, as shown in Fig. 2, after which the top extends downwardly in the curvatures g and h to a plane slightly below the rear fender 19. As best shown in Fig. 1, the top 13 is also transversely curved so its side edges join the top edges 12 of the sides 11.

It is obvious from the foregoing that the front and rear ends 16 and 17 of the top 13 are in the same plane as the bottom edges 14 of the sides 11; and it is also obvious from the foregoing that the air will be deflected upwardly and outwardly when the automobile is traveling either forward or backward.

The sides 11 are provided with semi-circular openings 20 in register with the front wheels 21 that are considerably larger than the diameter of the wheels through which the wheels can be reached for removing and repair, which openings are filled with plates 22 that are removably mounted in the wheel housings 23 that are arranged to rock in the same arc as that in which the front wheels are steered for turning.

The housings 23 have elongated bearings 24 that are pivotally mounted on bolts 25 that are supported by top plates 26 and brackets 27 that are secured to the frame 28 of the automobile.

The lower end of the left hand bolt 27 has a lever 29 secured to it that is connected by a drag link 30 to a lever 31 on the usual steering assembly 32 that is semi-diagrammatically indicated in Figs. 4 and 5.

The housings 23 are connected by a cross rod 33 that has its ends pivotally mounted in the lug bearings 34 by pins 35, and preferably the rod is provided with a turn buckle 36 so the housings can be adjusted so that their cover plates 22 are normally held in exact alignment with the sides 11 of the automobile; and also so the housings rock in the same arcs as the wheels 21 turn for steering the automobile.

As semi-diagrammatically shown by full and dotted lines in Figs. 4 and 5, the wheels 21 are connected to the steering unit 32 and are turned in the usual way. That is, the wheel hubs 37 are pivotally connected to the axle 15 by pins 38 that are arranged directly under the bolts 25.

The hubs 37 are provided with levers 40 that are pivotally connected by the usual cross rod 41. The left hand lever 40 is connected by a drag link 42 to a lever 43 on the steering assembly 32.

It is obvious from the foregoing description that the housings 23 and associated parts can have vertical movement independent of the axle movement and also that the front wheels and their respective housings will move in the same arcs.

The wheel cover plates 2 are removably secured in their respective housings, as best shown in Figs. 5, 6 and 8. As seen therein, the top edge portion of each plate is inserted in a seat 44 that is formed between an angle plate 45 and a lip 46 of each housing, and the bottom of each plate is supported by oppositely extending latching rods 47, 48 that extend through guides 49 through holes in the bottom portion of their respective housing.

The rods 47, 48 are pivotally connected to an eccentric plate 50 that is rocked on a pivot pin 51 by a lever 52 to seat or unseat the ends of these rods in the housings.

As best shown in Fig. 8, there are stops 53 and 54 on the plates 22 for limiting the movement of the lever 52. Normally the weight of the levers 52 holds their respective rods extended through the housings to detachably hold the plates 22 in place.

I also provide semicircular openings 55 in the sides of the automobile body opposite the rear wheels 56 through which the wheels can be reached for replacement and repair. These openings are closed by the removable plates 57 that are detachably secured in place in the same manner as the front wheel plates, except that the outer ends of the rods 47 and 48 are inserted in suitable holes in the body and the seats 44 are also arranged therein.

The sides 11 and wheel cover plates 22 and 57 are arranged so their outside surfaces are in exact alignment when the automobile is moving directly forward or backward to thereby reduce air resistance, and also the front wheel hoods are arranged so that the air resistance to forward travel is not materially increased when turned to change the direction of travel.

In operation, the wheel housings are moved in time with the arc movements of the front wheels, but can move vertically independently of them, as hereinbefore described, the housings being mounted on the automobile frame and the wheel steering means mounted on the wheel hubs.

I claim as my invention:

1. An improvement in automobiles, including in combination a body, a frame, pivotal supports connected to said body and frame, front wheel housings secured to said supports, front wheel cover plates detachably secured in said housings, an adjustable cross rod connection between said housings whereby a movement of one housing imparts a like movement to the other, a lever connected to the housing of the left hand wheel, a steering assembly, and a drag link connection between said lever and steering assembly.

2. An improvement in automobiles including in combination a body having straight vertical sides with openings therethrough adjacent the wheel base through which the wheels of the automobile can be reached for replacement or repair, removable front and rear cover plates for closing said openings that normally have their outer surfaces in alignment with the outer surfaces of said sides to reduce air resistance to the automobile in forward travel, a frame, right and left hand wheel housings in which said front plates are detachably secured, elongated bearings integral with said housings, supports for said bearings that are connected to said body and frame, a cross rod connecting said housing, said cross rod being adjustable to properly align said housings over said wheels, a steering assembly, and a connection between said left and right hand housings, whereby said housings can move in the steering arc of the front wheels when said steering assembly is actuated.

WESLEY J. DAVIS.